United States Patent
Lohr et al.

(10) Patent No.: US 7,193,835 B2
(45) Date of Patent: Mar. 20, 2007

(54) PERMANENT CONTROL DEVICE FOR THE GROUNDING OF AN ELECTRIC PUBLIC TRANSPORT VEHICLE RUNNING ON TIRES AND WHICH IS SELF-GUIDED

(75) Inventors: Robert Lohr, Hangenbieten (FR); Laurent Verdier, Strasbourg (FR)

(73) Assignee: Lohr Industrie, Hangenbieten (FR)

( * ) Notice: Subject to any disclaimer, the term of this patent is extended or adjusted under 35 U.S.C. 154(b) by 0 days.

(21) Appl. No.: 10/534,185

(22) PCT Filed: Nov. 7, 2003

(86) PCT No.: PCT/FR03/03337

§ 371 (c)(1),
(2), (4) Date: Jun. 3, 2005

(87) PCT Pub. No.: WO2004/043727

PCT Pub. Date: May 27, 2004

(65) Prior Publication Data

US 2006/0017325 A1    Jan. 26, 2006

(30) Foreign Application Priority Data

Nov. 8, 2002    (FR) .................................. 02 14062

(51) Int. Cl.
*B60C 19/08*    (2006.01)
*H05F 3/00*    (2006.01)

(52) U.S. Cl. ...................................... 361/217

(58) Field of Classification Search ................. 361/217
See application file for complete search history.

(56) References Cited

U.S. PATENT DOCUMENTS 5,277,285 A * 1/1994 Musachio ...................... 191/6
5,960,717 A 10/1999 Andre

FOREIGN PATENT DOCUMENTS

AT        409 248 B    6/2002

* cited by examiner

*Primary Examiner*—Stephen W. Jackson
*Assistant Examiner*—Dharti H. Patel
(74) *Attorney, Agent, or Firm*—Davis Bujold & Daniels, P.L.L.C.

(57) ABSTRACT

The device is characterized by units of pairs of two friction or sliding shoes (28) and (29), running on a metal guide rail (2), each fixed to a self-guidance unit (16), by way of rollers (26) and (27), running along the guide rail. The shoes (28) and (29) from an electrical circuit with the guide rail (2), comprising a detector with a safety loop supplied by a low voltage (BT+ and BT−) generator loop through which a current flows when the electrical grounding contacts via the shoes (28) and (29) and the guide rail (2) are correct. According to the quality of the electrical contact at the shoes (27) and (28), the security loop will be open or closed, representing a potential risk or no risk. The invention is of utility to producers of public transport vehicles which run on tires and are self-guiding.

14 Claims, 4 Drawing Sheets

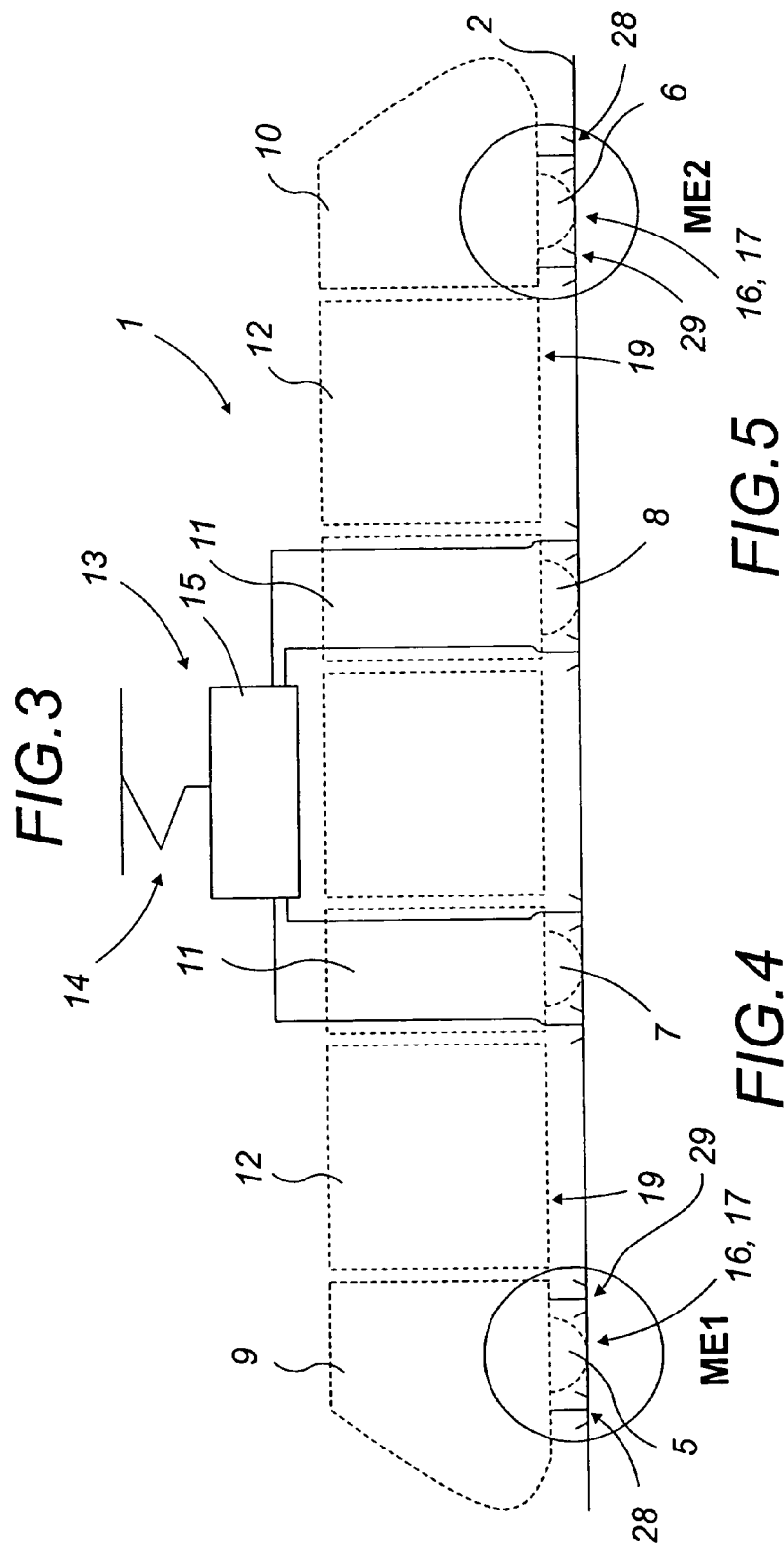
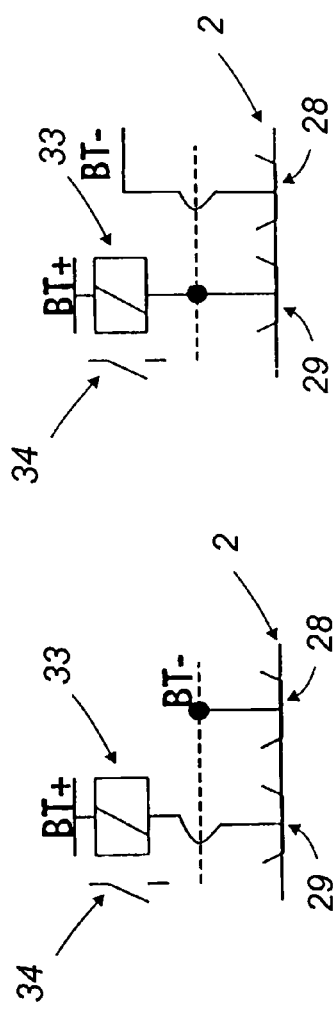

FIG.6

| State of Shoes | | | | Potential Risk | State of Safety Loop |
|---|---|---|---|---|---|
| ME1 | | ME2 | | | |
| Shoe 29 | Shoe 28 | Shoe 29 | Shoe 28 | | |
| 0 | 0 | 0 | 0 | no | ⊗ |
| 0 | 0 | 0 | 1 | no | ⊗ |
| 0 | 0 | 1 | 0 | no | ⊗ |
| 0 | 0 | 1 | 1 | no | ⊗ |
| 0 | 1 | 0 | 0 | no | ⊗ |
| 0 | 1 | 0 | 1 | YES | ● |
| 0 | 1 | 1 | 0 | no | ⊗ |
| 0 | 1 | 1 | 1 | YES | ● |
| 1 | 0 | 0 | 0 | no | ⊗ |
| 1 | 0 | 0 | 1 | no | ⊗ |
| 1 | 0 | 1 | 0 | no | ● |
| 1 | 0 | 1 | 1 | no | ● |
| 1 | 1 | 0 | 0 | no | ⊗ |
| 1 | 1 | 0 | 1 | YES | ● |
| 1 | 1 | 1 | 0 | no | ● |
| 1 | 1 | 1 | 1 | YES | ● |

0 = shoe attached
1 = shoe detached

Shoe 28 = shoe connected to (−)
Shoe 29 = shoe connected to (+)

● Safety loop open
⊗ Safety loop closed

FIG.7

| State of Shoes | | | | Potential Risk | State of Safety Loop |
|---|---|---|---|---|---|
| ME1 | | ME2 | | | |
| Shoe 29 | Shoe 28 | Shoe 29 | Shoe 28 | | |
| 0 | 0 | 0 | 0 | no | ⊗ |
| 0 | 0 | 0 | 1 | no | ⊗ |
| 0 | 0 | 1 | 0 | no | ⊗ |
| 0 | 0 | 1 | 1 | no | ⊗ |
| 0 | 1 | 0 | 0 | no | ⊗ |
| 0 | 1 | 0 | 1 | YES | ● |
| 0 | 1 | 1 | 0 | no | ● |
| 0 | 1 | 1 | 1 | YES | ● |
| 1 | 0 | 0 | 0 | no | ⊗ |
| 1 | 0 | 0 | 1 | no | ● |
| 1 | 0 | 1 | 0 | no | ● |
| 1 | 0 | 1 | 1 | no | ● |
| 1 | 1 | 0 | 0 | no | ⊗ |
| 1 | 1 | 0 | 1 | YES | ● |
| 1 | 1 | 1 | 0 | no | ● |
| 1 | 1 | 1 | 1 | YES | ● |

0 = shoe attached
1 = shoe detached

Shoe 28 = shoe connected to (−)
Shoe 29 = shoe connected to (+)

● Safety loop open
⊗ Safety loop closed

PERMANENT CONTROL DEVICE FOR THE GROUNDING OF AN ELECTRIC PUBLIC TRANSPORT VEHICLE RUNNING ON TIRES AND WHICH IS SELF-GUIDED

This application is a national stage completion of PCT/FR2003/003337 filed Nov. 7, 2003 which claims priority from French Application Serial No. 02/14062 filed Nov. 8, 2002.

FIELD OF THE INVENTION

The present invention relates to a safety device to protect passengers from electrical shock on a self-guided, electrically propelled public vehicle on tires.

BACKGROUND OF THE INVENTION

This safety device is designed to prevent a person outside the vehicle or in transit who is touching a metal part from exposure to a potentially dangerous electrical charge.

The danger of exposing passengers on public transportation vehicles to electrical shock has been the object of many regulations and codes.

Moreover, manufacturers of electrically propelled public transportation vehicles have provided safety equipment to decrease risk of electric shock and have conducted numerous experiments to control electrical insulation at various levels and on different units with which passengers are likely to come into contact.

There are many measures that can be taken to protect passengers from electrical shock. It is possible to use insulating coverings, for example, polyester or fiberglass epoxy, on all metal parts of the vehicle. The vehicle floor may be covered with an insulating material. Another customary practice is to electrically insulate metal devices and accessories such as doors, support bars, steps, and the like from the vehicle when they are installed. However, all these safety measures do not eliminate the danger of electrical shock to passengers and at best, merely reduce the rate of occurrence.

SUMMARY OF THE INVENTION

One of the objectives of the present invention is to eliminate this danger by grounding the vehicle chassis using dedicated shoes that slide or rub along the guide rail, which is itself connected to the ground. This permanent contact with the guide rail prevents any elevated potential in the vehicle chassis. However, a danger may persist in two instances: if the rail itself is insulated, or if the shoes become detached. Consequently there is a need for a specific means of permanently ensuring that the vehicle is properly grounded.

The general aim of the invention is to permanently control the quality of the chassis ground in order to eliminate any risk of electrical shock to passengers touching metal parts or pieces that may have electrical potential, to semi-instantaneously cut off the electrical supply if there is any danger, and more generally, to activate all the safety devices equipping the vehicle: for example, tripping the main circuit breaker, lowering the pantograph, and/or engaging the safety brake.

To control the grounding of the vehicle, the invention provides for equipping at least one of the vehicle's guide devices with two shoes to ensure friction contact with the guide rail, which is itself grounded, and to supply at least one of the shoes with low voltage current available from the vehicle. Preferably the two shoes are located on either side of the guide rollers or wheels, one in front of the guide assembly and the other behind it. An electric control device verifies whether the shoes are attached to or detached from the rail and whether the chassis ground is correct. There is an electrical component on the circuit or a supplemental computer circuit to activate the vehicle's safety systems if there is any danger.

In a preferred embodiment of the invention, these shoes, at least two in number, are provided on the guide assemblies of the vehicle. In this instance the preferable embodiment would be for the shoes to be respectively interconnected and connected to the ground, which will then all have the same potential, and to insulate from each other the shoes supplied with low voltage from the vehicle.

To achieve this, the safety device according to the present invention for preventing the risk of electric shock to passengers in self-guided public transportation vehicles traveling on tires along a metal guide rail using at least one self-guiding assembly governing a moving directional assembly with at least one guide wheel moving along the metal guide rail and with electrical energy as the driving force is characterized in that at least one front or rear self-guiding unit in the series of vehicles comprises at least two electrical contact elements separated from one another and in contact with the metal guide rail, and in that these contact elements, together with the portion of the guide rail that extends between them and a current passage detector, form a safety loop supplied by a low voltage electrical generator, with the detection means finishing a signal indicating whether the loop is open or closed depending upon whether the electrical contact at the level of the contact elements is good and satisfactory, or poor and unsatisfactory, in the latter case, causing the safety devices to activate or the safety measures to be applied.

The device of the present invention has several very interesting features:
  it is low cost, simple, and reliable;
  in any type of controller failure, the safety loop opens;
  vehicle availability is not affected; and
  if there are several vehicles, there is no electrical interaction among the vehicles or series of cars.

BRIEF DESCRIPTION OF THE DRAWINGS

Other characteristics and features of the invention will be apparent from the following description of one exemplary embodiment, accompanied by drawings, in which:

FIG. 3 is a schema showing an outline of a train and the placement of the electrical contact shoes on the guide rail;

FIG. 4 is the simplified electrical schema of a first variation of the device of the invention in which terminal BT− of the low voltage generator is connected to the chassis;

FIG. 5 is the simplified electrical schema of a second variation of the device of the invention in which terminal BT+ of the low voltage generator is connected to the chassis;

FIG. 6 is a diagram showing potential risk instances and the subsequent state of the safety loop in the case of the first variation; and FIG. 7 is a diagram showing potential risk instances and the subsequent state of the safety loop in the case of the second variation.

DETAILED DESCRIPTION OF THE INVENTION

Figure 1:
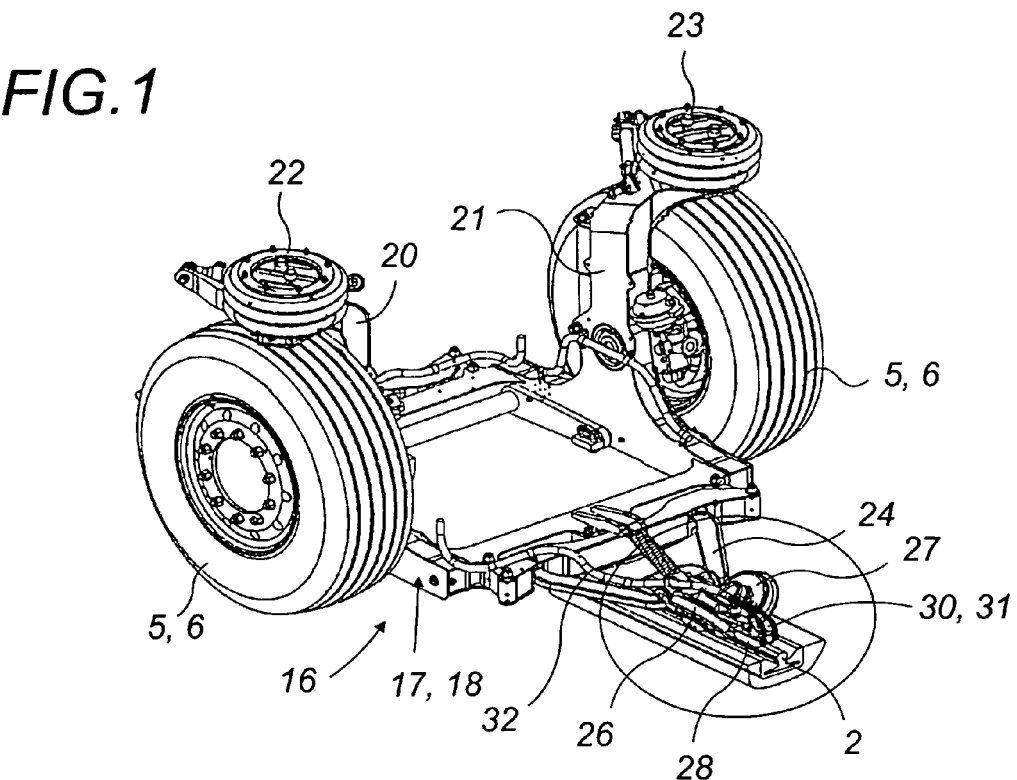
FIG. 1 is a schematic perspective of a guide assembly with the safety control device of the invention attached to it.

The present invention applies primarily to public transportation vehicles, for example, a self-guided series of units 1 driven by electricity with a self-guiding assembly on a metal rail 2 using one or more guide wheels 3 and 4 to travel along this metal guide rail, with the vehicle or series of units being displaced on front wheels 5, rear wheels 6, and intermediate wheels 7 and 8 equipped with tires.

The invention relates to self-guided public transportation passenger units 1 in a series, one example of which is shown in profile in FIG. 3.

These units 1 are formed of inter-articulated modules: front module 9, rear module 10, intermediate supported modules 11 and intermediate supporting modules 12. A unit 13 supplying high voltage electrical energy with a pantograph 14 reaches the motors through supply device 14 which has its own ground. These series comprise at the front and at the rear, and if the series is longer, also on either side of the median portion, the equivalent of a directional shaft governed by at least one self guiding assembly such as assembly 16 attached to a directional chassis 17, one exemplary embodiment of which is shown in greater detail in FIGS. 1 and 2.

The directional chassis 17 is comprised of the following principal elements:

A chassis frame 18 is pivotably attached to vehicle chassis 19, specifically the train chassis 1. It comprises two upright elements 20 and 21 to which the shafts of wheels 5 or 6 are attached, each wheel being provided with a tire. These upright elements extend upward to form supports for suspensions 22 and 23, for example, pneumatic connectors and shock absorbers.

The unit is guided along the metal guide rail 2 which may be a rail such as the one shown in the drawings. This guide rail 2 is set in or attached to the ground and is electrically connected to the ground. It may have the same shape as the one shown in the drawings.

Each of the self-guiding assemblies 16 like the one shown is comprised, for example, of at least one lift arm 24 which may pivot on a horizontal pivot axle, the end support of which is formed of a plate 25 to which two angled guide wheels 26 and 27 are rotationally attached, forming a V and maintained in a downward pointing V shape. These guide wheels may be flanged and they travel along guide rail 2 on its angled surfaces to ensure directional reference of the public transportation vehicle.

According to the invention two elements are provided for contacting the guide rail which are attached to the front or rear of the chassis.

These elements for contacting the guide rail may consist of shoes 28 and 29 for electrical contact by friction or rubbing, used in pairs according to the invention and separated from one another in order to define a portion of the guide rail.

Figure 2:
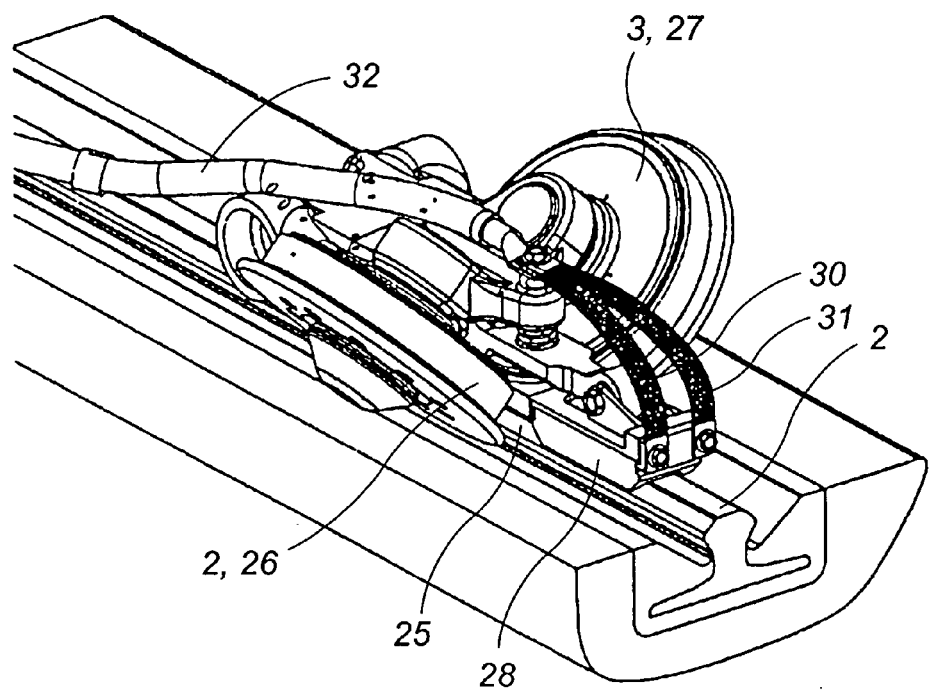
FIG. 2 is a detailed perspective of the circled portion of FIG. 1 with the guide arm being engaged on the guide rail by one of the electrical contact shoes.

These shoes may be placed as shown in FIGS. 1 and 2, with one on front of the end support holding angled guide wheels 26 and 27 and the other (not shown) on the other side of the guide wheels in the axis of the guide rail or on another guide unit.

The body of each shoe is pivotably attached or otherwise articulated to a support, elastically suspended, or articulated to the chassis of the train and depending upon the situation, properly electrically grounded relative to this support.

Each shoe may comprise a subsurface shaped in accordance with the reverse profile of the rail to ensure tight, complete sliding or friction contact. In the example shown in the drawings, it is trough-shaped.

According to a first embodiment, one shoe 28 is electrically connected directly to the ground of the chassis or to a negative terminal BT− on an electrical generator, as will be shown below, while the other shoe 29 of the pair is connected to the positive terminal BT+ of the same generator through a detector using an electrical connection with a large conductive section.

The electrical connection of shoe 28 in the version shown may consist of two braided strips 30 and 31 with their front ends separated and attached with screws to the front portion of the body of the shoe, the rear extremities of which are joined to those of an electrical cable 32 with an insulating coating, the other end of which is connected to the negative terminal BT− of an electrical generator, which is itself connected to the chassis ground.

Still with reference to the first embodiment, the other shoe 29 (not shown in FIGS. 1 and 2) is electrically connected through a detector as described below to positive terminal BT+ of a low voltage electrical generator, the negative terminal BT− of which is electrically connected to the metal vehicle chassis.

According to FIGS. 1 and 2 and the description above, the two shoes 28 and 29 in a single pair are located on either side of the guide wheels along the axis of the guide rail. According to another variation, shown schematically in FIG. 3, the two shoes in a single pair may be located on either side of the axle line at the front and back along the axis of the guide rail. Thus, they form two groups referenced in this description as ME1 for the front (circled on the left portion of floor in the drawing) and ME2 for the rear (circled on the right portion of the same floor in the drawing).

In order to permanently determine the condition and quality of the electrical contact with the metal guide rail, i.e., electrical continuity with the metal guide rail and thus the quality of the electrical ground, the following arrangement has been designed.

The arrangement groups two shoes 28 and 29 on either side of the guide wheels or two shoes on either side of the shaft lines (pairs ME1 and ME2), despite whatever means of mechanical support is used or however they are supported, that is, the mechanical connection to the arm or the chassis, which may be accomplished using annexed elements to support the multidirectional articulations with appropriate elastic suspensions that may be doubled using preconstraints or any other means.

Shoes 28 and 29 on the same guide unit or the same directional unit ME1 or ME2 are attached to a low voltage, preferably continuous, electrical circuit, for example, 24 volts between the terminals referenced as BT+ and BT− on a single electrical generator, as shown in FIG. 4, forming a safety circuit. On this safety circuit there are attached in a series between terminals BT+ and BT− of the generator in the form of a loop called the safety loop, a detector, for example a current or current passage detector or an electromagnetic device such as a relay switch comprising an electromagnetic coil 33 actuating at least the contacts of a cutoff 34, a first shoe 29, the metal conductive guide rail 2, and the second shoe 28 of the same pair ME1 or ME2 electrically connected to terminal BT−, which is itself connected to the ground of the chassis.

An analogous arrangement is used for the directional unit at the rear of the series.

The two arrangements may be independent, grouped in parallel, or grouped by simply connecting the negative terminals to each other.

Our example is limited to two directional units. In the case of longer series, one or two intermediate directional units may be provided, each with a detection system as described above.

Insofar as the current detector or current passage detector is concerned, it may consist of any appropriate detector furnishing a useful signal when current exceeding a minimum intensity threshold passes through, if it has no precise significance, or if the quality of the electrical contact it represents is too uncertain.

The individual operation of each detection circuit is as follows.

If the electrical contact at the level of each of the two shoes 28 and 29 is of sufficient quality, the current passes through the detection loop and the coil of the relay is supplied; beyond a certain threshold current, it triggers the closing of the contacts on shutoff 34 relative to coil 33 and keeps them closed for as long as the value of the current exceeds the engagement threshold. The principle remains the same when a current detector replaces the electromagnetic coil device. If the quality of the electrical contacts degrades, if an event limiting the passage of current occurs, or if for any reason whatsoever the contact cuts off or becomes weak, mediocre or erratic, coil 33 will either no longer be supplied or will be insufficiently supplied and cutoff 34 switch will open.

The two front units ME1 and rear units ME2 operate in the same way.

The table in FIG. 6 sets forth all the possible conditions in a system with two units ME1 and ME2 with conclusions about the potential risk and the state of the safety loop representing the grid of a control program that will lead to eliminating risk by either cutting off the general electrical supply, lowering the pantograph, closing the main circuit breaker, or engaging the safety brake if an important risk is identified.

A defective ground in guide rail 2 will also be detected because it engages the detector.

Every situation occurring in the open safety loop corresponding to a black circle in FIG. 6 is described below, four of which are considered potentially dangerous.
1. ME1 shoe 29 attached and ME1 shoe 28 detached with ME2 shoe 29 attached and ME2 shoe 28 detached;
2. ME1 shoe 29 attached and ME1 shoe 28 detached with ME2 shoe 29 detached and ME2 shoe 28 detached;
3. ME1 shoe 29 detached and ME1 shoe 28 attached with ME2 shoe 29 detached and ME2 shoe 28 attached;
4. ME1 shoe 29 detached and ME1 shoe 28 attached with ME2 shoe 29 detached and ME2 shoe 28 detached;
5. ME1 shoe 29 detached and ME1 shoe 28 detached with ME2 shoe 29 attached and ME2 shoe 28 detached;
6. ME1 shoe 29 detached and ME1 shoe 28 detached with ME2 shoe 29 detached and ME2 shoe 28 attached;
7. ME1 shoe 29 detached and ME1 shoe 28 detached with ME2 shoe 29 detached and ME2 shoe 28 detached.

This data from the table in FIG. 6 establishes a warning system for potential danger from electrical shock leading to immediate precautionary measures, up to and including cutting the supply of electricity to the public transportation vehicle, particularly to the series of units.

According to a second variation, shown in FIGS. 5 and 7, the two shoes 28 and 29 on a single guide assembly or a single directional assembly ME1 or ME2, also attached to a low voltage electrical circuit that is preferably continuous, for example 24 volts between terminals referenced as BT+ and BT− on a single electrical generator as shown in FIG. 5, form a safety circuit. The specific feature of this embodiment concerns the connection of terminals B+ and B− of the low voltage generator. Here terminal BT+ of the generator is connected to the ground, contrary to the preceding variation. Likewise, in the safety circuit, there is a series of elements attached between terminals B+ and B− of the generator in the form of a loop called the safety loop, for example a current detector, a current passage detector, an electromagnetic device such as a relay comprising an electromagnetic coil 33 actuating at least the contacts on a cutoff switch 34, a first shoe 29, the conductive metal guide rail 2, and a second shoe 28 in the same pair ME1 or ME2 electrically connected to terminal BT−.

As indicated above, shoe 29 is connected to the ground of the chassis through electromagnetic coil 33.

A similar arrangement exists for the directional unit at the rear of the train.

The two arrangements may be independent, grouped in parallel, or grouped by the simple interconnection of the positive terminals.

The individual operation of each detection circuit is semi-identical to that described above.

If conditions for the passage of current are met, the current passes through the detection loop, the relay coil is supplied, and beyond a certain current threshold, it engages the closing of the contacts on switch 34 relative to coil 33 and keeps them closed as long as the current value exceeds the threshold of engagement.

If the quality of the electrical contacts degrades, if an event limiting the passage of current occurs, or if for any reason whatsoever the contact cuts off or becomes weak, mediocre or erratic, coil 33 will either no longer be supplied or will be insufficiently supplied and cutoff switch 34 will open.

The two front units ME1 and rear units ME2 operate in the same way.

The table in FIG. 7 sets forth all the possible conditions in a system with two units ME1 and ME2 with conclusions about the potential risk and the state of the safety loop representing the grid of a control program that will lead to eliminating risk by either cutting off the general electrical supply, lowering the pantograph, closing the main circuit breaker, or engaging the safety brake if an important risk is identified.

A defect in the ground of guide rail 2 can also be detected because it engages the detector.

Every situation occurring in the open safety loop corresponding to a black circle in FIG. 7 is described below, four of which are considered potentially dangerous.
1. ME1 shoe 29 attached and ME1 shoe 28 detached with ME2 shoe 29 attached and ME2 shoe 28 detached;
2. ME1 shoe 29 attached and ME1 shoe 28 detached with ME2 shoe 29 detached and ME2 shoe 28 attached;
3. ME1 shoe 29 attached and ME1 shoe 28 detached with ME2 shoe 29 detached and ME2 shoe 28 detached;
4. ME1 shoe 29 detached and ME1 shoe 28 attached with ME2 shoe 29 attached and ME2 shoe 28 detached;
5. ME1 shoe 29 detached and ME1 shoe 28 attached with ME2 shoe 29 detached and ME2 shoe 28 attached;
6. ME1 shoe 29 detached and ME1 shoe 28 attached with ME2 shoe 29 detached and ME2 shoe 28 detached;
7. ME1 shoe 29 detached and ME1 shoe 28 detached with ME2 shoe 29 attached and ME2 shoe 28 detached;
8. ME1 shoe 29 detached and ME1 shoe 28 detached with ME2 shoe 29 detached and ME2 shoe 28 attached; and
9. ME1 shoe 29 detached and ME1 shoe 28 detached with ME2 shoe 29 detached and ME2 shoe 28 detached.

This data from the table in FIG. 7 establishes a warning system for potential danger from electrical shock leading to immediate precautionary measures, up to and including cutting the supply of electricity to the public transportation vehicle, particularly to the series of units.

Because of the larger number of danger signal situations, the second embodiment offers greater security that the first one.

The invention claimed is:

1. A device for permanently monitoring a ground for safety purposes and for preventing a risk of electrical shock to passengers on a self-guided public transportation vehicle utilizing electrical energy as a driving force and running on tires along a metal guide rail supported on a surface, the metal guide rail being connected as a ground and the vehicle using at least one self-guiding assembly governing a movable directional assembly with at least one guide wheel traveling along the metal guide rail, the device being incorporated into the vehicle to prevent the risk of electrical shock to passengers of vehicle, the device comprising:
    at least two electrical contact elements contacting the grounded metal guide rail wherein the contact elements are separated from one another and in contact with the metal guide rail and the contact elements together with a portion of the guide rail extending between the contact elements forming a safety loop supplied from a low voltage electrical generator with terminals (BT+ and BT−) connected to the safety loop; and
    a current passage detector connected to the safety loop and detecting a current flowing in the safety loop and furnishing a signal indicating whether the safety loop is one of open or closed depending upon whether electrical contact at a level of the contact elements is one of satisfactory or unsatisfactory, and when the electrical contact is unsatisfactory, the signal causing at least one of safety elements to be engaged.

2. The device according to claim 1, wherein at least one of the at least two electrical contact elements is supported by the self-guiding assembly.

3. The device according to claim 1, wherein the low voltage electrical generator generates a continuous low voltage.

4. The device according to claim 3, wherein the low voltage electrical generator generates a continuous low voltage of 24 volts.

5. The device according to claim 1, wherein a first contact elements is electrically connected to a chassis and to a negative terminal (BT−) of the electrical generator and the other contact elements is connected to a positive terminal (BT+) of the generator through the detector, while the negative terminal (BT−) of the generator is connected to the chassis.

6. The device according to claim 1, wherein a first contact elements is electrically connected to a negative terminal (BT−) of the electrical generator and a second contact element is connected to a positive terminal (BT+) of the generator through the detector, while the positive terminal (BT+) is connected to a chassis.

7. The device according to claim 1, wherein each of the contact elements is one of a sliding or friction shoe (28, 29) that is displaced along the metal guide rail (2).

8. The device according to claim 1, wherein the detector is a coil (33) of an electromagnet which actuates contacts of an interrupt switch (34).

9. The device according to claim 2, wherein the contact elements are longitudinally attached on either side of at least one guide wheel.

10. The device according to claim 1, wherein the contact elements are attached sequentially one behind the other on a chassis at a front of a series of the vehicles.

11. The device according to claim 1, wherein the safety loop is provided dt a front of a series of the vehicles with the low voltage electrical generator (BT+ and BT−) and another safety loop at a rear of the series with another low voltage electrical generator (BT+ and BT−).

12. The device according to the claim 11, wherein the negative terminals (BT−) on the low voltage electrical generator are connected to each other and to a chassis.

13. The device according to claim 11, wherein the negative terminals (BT−) on the low voltage electrical generators are connected to each other and the positive terminals (BT+) are connected to each other and to a chassis.

14. The device according to claim 1, wherein when the electrical contact is unsatisfactory the device also applies safety measures.

* * * * *